(12) United States Patent
Klein et al.

(10) Patent No.: US 7,562,137 B2
(45) Date of Patent: Jul. 14, 2009

(54) METHOD FOR VALIDATING A REMOTE DEVICE

(75) Inventors: Steven Edward Klein, Tucson, AZ (US); James Chien-Chiung Chen, Tucson, AZ (US); Patricia Ching Lu, Fremont, CA (US); Matthew Joseph Kalos, Tucson, AZ (US)

(73) Assignee: Internatioal Business Machines Corporation, Armonk, NY (US)

( * ) Notice: Subject to any disclaimer, the term of this patent is extended or adjusted under 35 U.S.C. 154(b) by 1043 days.

(21) Appl. No.: 10/719,404

(22) Filed: Nov. 20, 2003

(65) Prior Publication Data

US 2005/0114488 A1    May 26, 2005

(51) Int. Cl.
*G06F 15/173* (2006.01)
*G06F 15/16* (2006.01)
(52) U.S. Cl. .................. 709/224; 709/220; 709/229
(58) Field of Classification Search .................. None
See application file for complete search history.

(56) References Cited

U.S. PATENT DOCUMENTS

| | | | |
|---|---|---|---|
| 6,434,683 B1 | 8/2002 | West et al. | |
| 6,601,187 B1 * | 7/2003 | Sicola et al. | 714/6 |
| 6,609,165 B1 * | 8/2003 | Frazier | 710/36 |
| 6,944,133 B2 * | 9/2005 | Wisner et al. | 370/242 |
| 7,251,743 B2 * | 7/2007 | Chen et al. | 714/6 |
| 2002/0161848 A1 | 10/2002 | Willman et al. | |

OTHER PUBLICATIONS

"Fibre Channel Framing and Signaling", INCITS working draft proposed American National Standard of Accredited Standards Committee, Apr. 9, 2003, Chapter 12.
G. Castets et al., "IBM TotalStorage Enterprise Storage Server Implementing ESS Copy Services with IBM e server zSeries", IBM Corporation, Document No. SG24-5680-01, Apr. 2003, Chapter 1.

* cited by examiner

*Primary Examiner*—John B. Walsh
(74) *Attorney, Agent, or Firm*—Rabindranath Dutta; Konrad Raynes & Victor LLP (57) ABSTRACT

A first device determines a possibility of an invalidation of a second device, wherein the first device is coupled to the second device via a fabric. A query is sent from the first device to validate the second device, in response to determining the possibility of the invalidation of the second device. A determination is made, at the first device, whether to continue I/O operations from the first device to the second device based on receiving a response to the query within a time period.

21 Claims, 6 Drawing Sheets

METHOD FOR VALIDATING A REMOTE DEVICE

BACKGROUND

1. Field

The present invention relates to a method, system, and an article of manufacture for validating a remote device.

2. Description of the Related Art

Fibre channel networks may be used in storage area networking (SAN) environments to attach servers and storage. In certain implementations, fibre channel networks may also be used to allow for peer-to-peer connections between storage devices. Fiber channel networks may be classified into a variety of topologies. In a point-to-point topology, each pair of network components are connected via dedicated links. In an arbitrated loop topology, groups of network components are connected via a loop. In a switched fabric topology, network components are connected via switches. Errors may occur in a switched fabric network for various reasons. For example, cables may be unplugged temporarily in the switched fabric, or cables may be accidentally swapped resulting in misdirected data in the network.

Certain networked information technology systems, including storage systems, may need protection from site disasters or outages. Implementations for protecting from site disasters or outages may include mirroring or copying of data in storage systems. Such mirroring or copying of data may involve interactions among hosts, storage systems and connecting networking components of the information technology system.

An ENTERPRISE STORAGE SERVER* (ESS) may be a disk storage server that includes one or more processors coupled to storage devices, including high capacity scalable storage devices, Redundant Array of Independent Disks (RAID), etc. The ENTERPRISE STORAGE SERVERs (disk storage servers) may be connected to a network, such as a fibre channel network, and include features for copying data in storage systems. Peer-to-Peer Remote Copy (PPRC) is an ESS copy function that allows the shadowing of application system data from a first site to a second site. The first site may be referred to as an application site, a local site, or a primary site. The second site may be referred to as a recovery site, a remote site, or a secondary site. In certain implementations, the first and second site may be coupled via fibre channel networks that includes switches.

*ENTERPRISE STORAGE SERVER (ESS) is a trademark of International Business Machines Corp.

SUMMARY OF THE PREFERRED EMBODIMENTS

Provided are a method, system, and article of manufacture, wherein in certain embodiments a first device determines a possibility of an invalidation of a second device, wherein the first device is coupled to the second device via a fabric. A query is sent from the first device to validate the second device, in response to determining the possibility of the invalidation of the second device. A determination is made, at the first device, whether to continue I/O operations from the first device to the second device based on receiving a response to the query within a time period.

In additional embodiments, determining, by the first device, the possibility of the invalidation of the second device, further comprises determining whether the first device has received either a notification of a state change from the fabric or has timed out while waiting for a completion of an I/O operation sent from the first device to the second device.

In yet additional embodiments, sending the query further comprises sending a service frame from the first device to the second device, wherein the service frame is capable of determining a presence of the second device without disrupting the I/O operations. In further embodiments, the service frame is a PDISC Extended Link Service frame.

In further embodiments, the I/O operations are continued, if the response to the query within the time period is a frame that validates the World Wide Node Name and the World Wide Port name associated with a connection to the second device. In further embodiments, the frame is an LS_ACC frame.

In yet further embodiments, a connection is terminated from the first device to the second device, if the response to the query is not received within the time period or if the response is a frame that indicates that the second device does not consider the first device to be logged in to the second device. In further embodiments, the frame is a LOGO frame or a LS_RJT frame.

In additional embodiments, the query is received at the second device, prior to determining, at the first device, whether to continue I/O operations from the first device to the second device. A determination is made, at the second device, whether the first device is a valid initiator to the second device. The response is sent from the second device, wherein the response indicates that the second device does not consider the first device to be logged in to the second device, in response to determining that the first device is not the valid initiator to the second device.

In yet additional embodiments, the query is received at the second device, prior to determining, at the first device, whether to continue I/O operations from the first device to the second device. A determination is made at the second device, whether the first device is considered to be logged in to the second device. The response is sent from the second device, wherein the response indicates that the second device considers the first device to be logged in to the second device, in response to determining that the first device is considered to be logged in to the second device.

In still further embodiments, the query is received at the second device, prior to determining, at the first device, whether to continue I/O operations from the first device to the second device. A determination is made, at the second device, whether the first device is considered to be logged in to the second device. The response is sent from the second device, wherein the response indicates that the second device does not consider the first device to be logged in to the second device, in response to determining that the first device is not considered to be logged in to the second device.

In additional embodiments, the first and second devices are fibre channel adapters coupled to primary and secondary storage controllers respectively, wherein the fabric is a switched fabric, and wherein the fibre channel adapters communicate using extended link services commands.

In certain embodiments implemented in a fibre channel PPRC environment, a PPRC primary device, such as, a primary storage control unit, may determine, via positive identification of a secondary storage control unit, whether a login is actually required to the secondary storage control unit because of a state change in a fibre channel network. As a result of the positive identification of the secondary storage control unit repeated disruptive logins to the secondary storage control unit may not be required in the embodiments.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations. It is understood that other implementations may be utilized and structural and operational changes may be made without departing from the scope of the present implementations.

Disruptive Logins in Remote Date Transfer

If a connection for remote data transfer over a fibre channel storage area network (SAN) exists, the primary storage controller may determine via an external notification or through an internal error detection, that a state change has occurred in the SAN or in the secondary storage controller. The primary storage controller may have to validate the identity of the secondary storage controller. To validate the identity of the secondary storage controller, the primary storage controller may try to log into the secondary storage controller once again. However, the login operation to the secondary storage controller may be disruptive to the secondary storage controller. Logging in too often, i.e., whenever a state change may have occurred, may have a negative impact on ongoing input/output (I/O) operations if the state change does not actually require the login. Waiting too long before trying to login in can cause a permanent I/O failure if the login should have been performed.

Certain embodiments of the invention allow a primary storage controller to determine through validation of the secondary storage controller, if a login is actually required to the secondary storage controller. Certain embodiments of the invention are non-disruptive to any I/O in progress, in case a login is not required.

Validating a Remote Device

Figure 1:
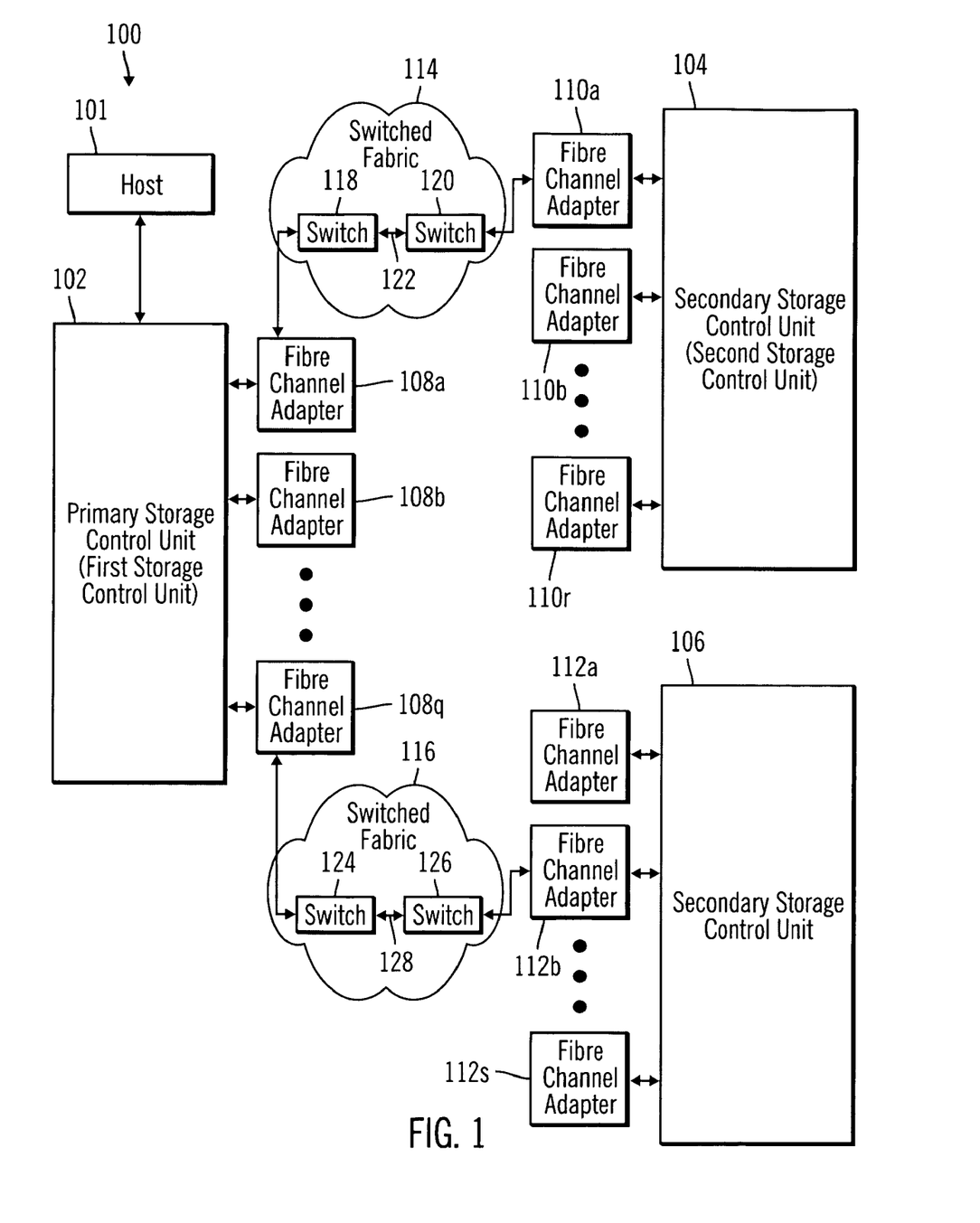
FIG. 1 illustrates a block diagram of a computing environment, in accordance with certain described aspects of the invention.

FIG. 1 illustrates a block diagram of a computing environment 100, in accordance with certain described aspects of the invention. A host 101 is coupled to a storage unit, such as, a primary storage control unit 102, where the host 102 may sent input/output (I/O) requests to the primary storage control unit 102. The primary storage control unit 102 may send the I/O requests to one or more other storage units, such as, secondary storage control units 104, 106. The storage control units 104, 106 may also be referred to as storage controllers. Although only two secondary storage control units 104, 106 are shown, certain embodiments may include a greater or a fewer number of secondary storage control units. Furthermore, while only a single host 101 is shown coupled to the primary storage control unit 102, in other embodiments a plurality of hosts may be coupled to the primary storage control unit 102. The host 101 may be any computational device known in the art, such as a personal computer, a workstation, a server, a mainframe, a hand held computer, a palm top computer, a telephony device, network appliance, etc.

In certain embodiments, the primary storage control unit 102 and the secondary storage control units 104, 106 are coupled by a fibre channel data interface mechanism. In other embodiments, different data interface mechanisms may be used to couple the primary storage control unit 102 to the secondary storage control units 104, 106.

The storage control units 102, 104, 106 may each include one or more storage subsystems (not shown). In certain embodiments, the storage subsystems may be computational devices that include storage volumes (not shown) configured as a Direct Access Storage Device (DASD), one or more RAID ranks, Just a bunch of disks (JBOD), or any other data repository system known in the art.

In certain embodiments, the storage control units 102, 104, 106 are coupled to one or more fibre channel adapters. For example, the primary storage control unit 102 may be coupled to fibre channel adapters 108a ... 108q, the secondary storage control unit 104 may be coupled to fibre channel adapters 110a ... 110r, and the secondary storage control unit 106 may be coupled to fibre channel adapters 112a ... 112s.

In some embodiments, a fabric, such as, a switched fabric, may couple a first fibre channel adapter coupled to the primary storage control unit 102, to a second fibre channel adapter coupled to a secondary storage control unit 104, 106. For example, a switched fabric 114 couples the fibre channel adapter 108a that is coupled to the primary storage control unit 102, to the fibre channel adapter 110a that is coupled to the secondary storage control unit 104. Additionally, a switched fabric 116 may couple the fibre channel adapter 108q that is coupled to the primary storage control unit 102, to the fibre channel adapter 112b that is coupled to the secondary storage control unit 106. Therefore, in certain embodiments the primary storage control unit 102 may communicate with the secondary storage control units 104, 106 via fibre channel adapters 108a ... 108q, 110a ... 110r, 112a ... 112s and the switched fabrics 1114, 116.

In certain embodiments, the switched fabrics 114, 116 may include one or more switches. For example, switched fabric 114 includes switches 118 and 120, where the switches 118 and 120 are interconnected via a cable 122. Switched fabric 116 may include switches 124 and 126, where the switches 124 and 126 are interconnected via a cable 128.

State changes may occur in the computing environment 100 for a variety of reasons. For example, in certain embodiments the primary storage control unit 102 sends an I/O command to the secondary storage control unit 104 via the fibre channel adapter 108a, the switch 118, the cable 122, the switch 120, and the fibre channel adapter 110a. In certain situations, the cable 122 may be accidentally disconnected from switch 120 and may be connected to switch 128 and a state change may occur in the computing environment 100. In such a situation I/O commands sent by the primary storage control unit 102, where the I/O commands are intended for the secondary storage control 104, may be misdirected to the secondary storage control 106. If the secondary storage control 106 executes the misdirected I/O commands then data in the secondary storage control 106 may not be consistent with data in the primary storage control unit 102. Therefore, it may be sometimes be desirable to terminate certain connections in the computing environment 100 when certain state changes is detected. State changes may also occur for various other reasons in the computing environment 100, such as, swapping or disconnection of other cables, changes in configuration of switches, etc. In certain embodiments, the switched fabric 114 may notify the fibre channel adapter 108a of the state change. In other embodiments, the swapping of the cables 122, 128 may cause a timeout of an I/O operation occurring between the primary storage control unit 102 and the secondary storage control unit 104.

If the fibre channel adapter 108a detects either by an external notification or via internal error detection that a state change has occurred in the computing environment 100, either in the switched fabric 114 or in the fibre channel adapter coupled to the secondary storage control unit 104, then in embodiments of the invention the fibre channel adapter 108a may have to positively validate the identity of the secondary storage control unit 104 to which the fibre channel adapter 108a is coupled.

While the fibre channel adapter 108a may attempt to perform a login to the secondary storage control unit 104 to positively identify the secondary storage control unit 104, repeated logins to the secondary storage control unit 104 may be disruptive to ongoing I/O operations of the primary storage control unit 102 to the secondary storage control unit 104. However, if the fibre channel adapter 108a waited too long to perform a login to the secondary storage control unit 104, then failure may occur for an ongoing I/O operation between the primary storage control unit 102 and the secondary storage control unit 104.

In certain embodiments of the invention, the fibre channel adapter 108a may send a PDISC Extended link service frame that is directed at the fibre channel adapter 110a to determine the presence of the secondary.

Therefore, FIG. 1, illustrates a computing environment 100 in which a fibre channel adapter 108a coupled to a primary storage control unit 102 sends a PDISC Extended Link Service frame to determine the presence of the secondary storage control unit 104. The PDISC Extended Link Service frame is non-disruptive to I/O operations occurring between the primary storage control unit 102 and the secondary storage control unit 104.

Figure 2A:
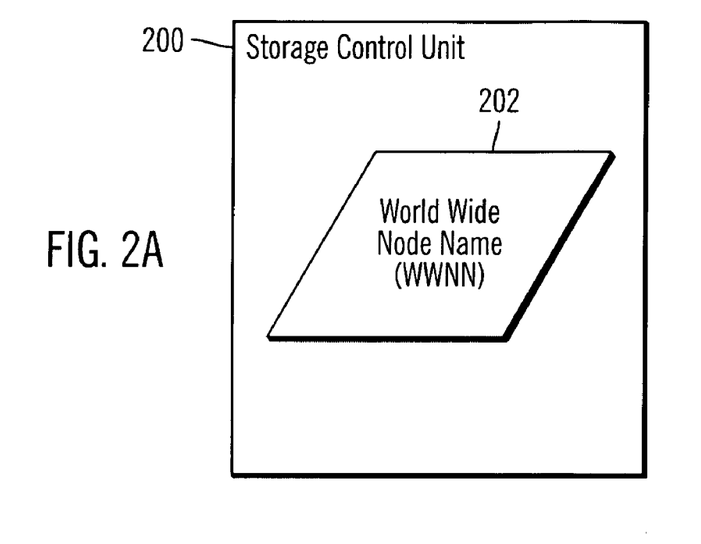
FIGS. 2A and 2B illustrates a block diagrams of data structures implemented in a storage control unit and a fibre channel adapter, in accordance with certain described implementations of the invention.
Figure 2B:
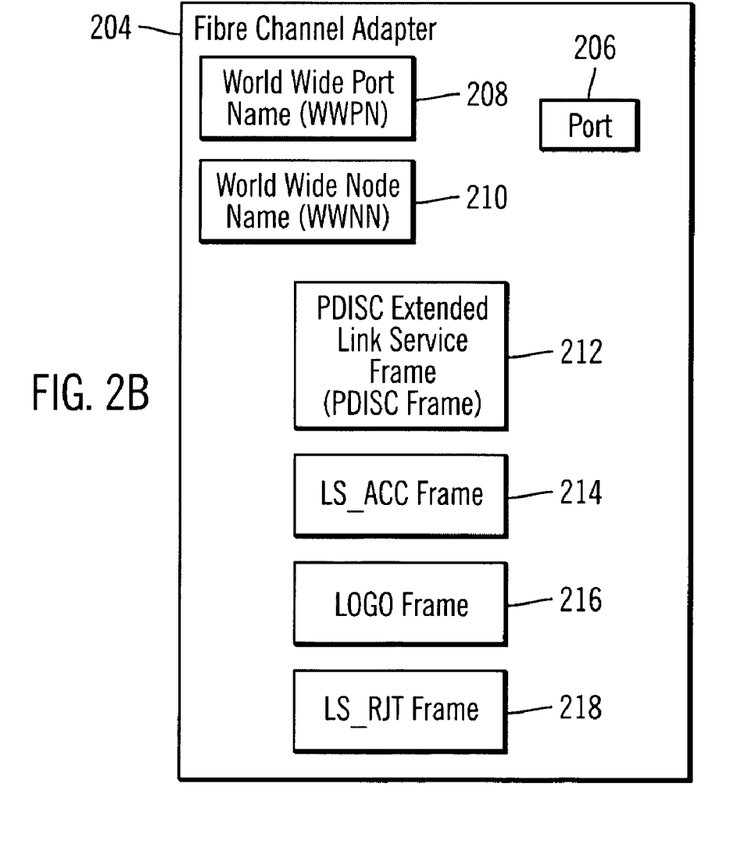

FIGS. 2A and 2B illustrates a block diagrams of data structures implemented in the storage control units 102, 104, 106 and the fibre channel adapters 108a . . . 108q, 110a . . . 110r, 112a . . . 112s in accordance with certain described implementations of the invention.

A storage control unit 200, where the storage control unit 200 may be any of the storage control units 102, 104, 106, may include a data structure that corresponds to a World Wide Node Name (WWNN) 202, where the WWNN 202 is an identification of the storage control unit 200.

A fibre channel adapter 204, where the fibre channel adapter 204 may be any of the fibre channel adapters 108a . . . 108q, 110a . . . 110r, 112a . . . 112s may include a port 206. The fibre channel adapter 204 may communicate with another fibre channel adapter via a fibre channel link established between port 206 and a corresponding port in the another fibre channel adapter. Although, the fibre channel adapter 204 is shown with only one port 206, in alternative embodiments the fibre channel adapter may have a plurality of ports.

The fibre channel adapter 204 includes a World Wide Port Name (WWPN) 208 that is an identification of the port 206 the fibre channel adapter 204. The fibre channel adapter 204 may also include a WWNN 210 that corresponds to the WWNN 202 of the storage control unit to which the fibre channel adapter is coupled. For example, fibre channel adapter 108a may include the WWNN of the primary storage control unit 102, and fibre channel adapter 110a may include the WWNN of the secondary storage control unit 104.

The fibre channel adapter 204 may also include capabilities to generate a PDISC Extended Link Service frame 212, a LS_ACC frame 214, a LOGO frame and a LS_RJT frame 218. The generated frames 212, 214, 216, 218 may be sent from one fibre channel port to another fibre channel port.

The PDISC Extended Link Service frame 212, also referred to as a PDISC frame provides a method for two fibre channel ports to exchange operating parameters without disrupting I/O operations on either of the two fibre channel ports. In certain embodiments, a first fibre channel port may send a PDISC frame 212 to a second fibre channel port. In response to receiving the PDISC frame 212 at the second fibre channel port, the second fibre channel port may respond with a LS_ACC frame 214 to indicate that the second fibre channel port considers the first fibre channel port to be logged in to the second fibre channel port. In response to receiving the PDISC frame 212 at the second fibre channel port, the second fibre channel port may respond with a LOGO frame 216 or a LS_RJT frame 218 to indicate that the second fibre channel port does not consider the first fibre channel port to be logged in to the second fibre channel port.

In certain embodiments, in response to the primary storage control unit 102 executing instructions to send I/O commands to the secondary storage control unit 104, the primary storage control unit 102 may request the switch 118 (via the fibre channel adapter 108a) to return a destination ID (not shown) of the secondary storage control unit 104 by supplying the WWPN 208 of the fibre channel port corresponding to the fibre channel adapter 110a, to the switch 118. In certain embodiments, the switch 118 may, in conjunction with nameservers implemented in the switched fabric 114, return the destination ID of the secondary storage control unit 104. The primary storage control unit 102 may login to the secondary storage control unit 104 by using the destination ID. After logging in, the primary storage control unit 102 may send I/O commands to the secondary storage control unit 104.

The destination ID of a secondary storage control unit may not always be unique. For example, in certain embodiments the secondary storage control unit 104 may be referred to with the destination address of one in the switched fabric 114, and the secondary storage control unit 106 may also be referred to with the destination address of one in the switched fabric 116. In such a situation, if the cable 122 is disconnected from switch 122 and connected to switch 126, after the primary storage control unit 102 has started sending I/O commands to the secondary storage control unit 104 by using the destination ID of one, then the primary storage control unit 102 would be misdirecting the I/O commands to the secondary storage control unit 106 via the switched fabric 116 because the destination ID of one appears to the switched fabric 116 as the secondary storage control unit 106. If the secondary storage control unit 106 executes the received I/O commands, then data in the secondary storage control unit 106 may not be consistent with the primary storage control unit 104. In certain embodiments of the invention, a PDISC frame 212 sent from the fibre channel adapter 108a may perform a non-disruptive validation of the secondary storage control unit, such that, the primary storage control unit 102 can attempt to login in once again to the correct secondary storage control unit in case of a change in the state of the switched fabric 114.

Therefore, FIGS. 2A and 2B illustrates embodiments in which a PDISC frame 212 is used to validate the identity of the secondary storage control unit 104.

Figure 3:
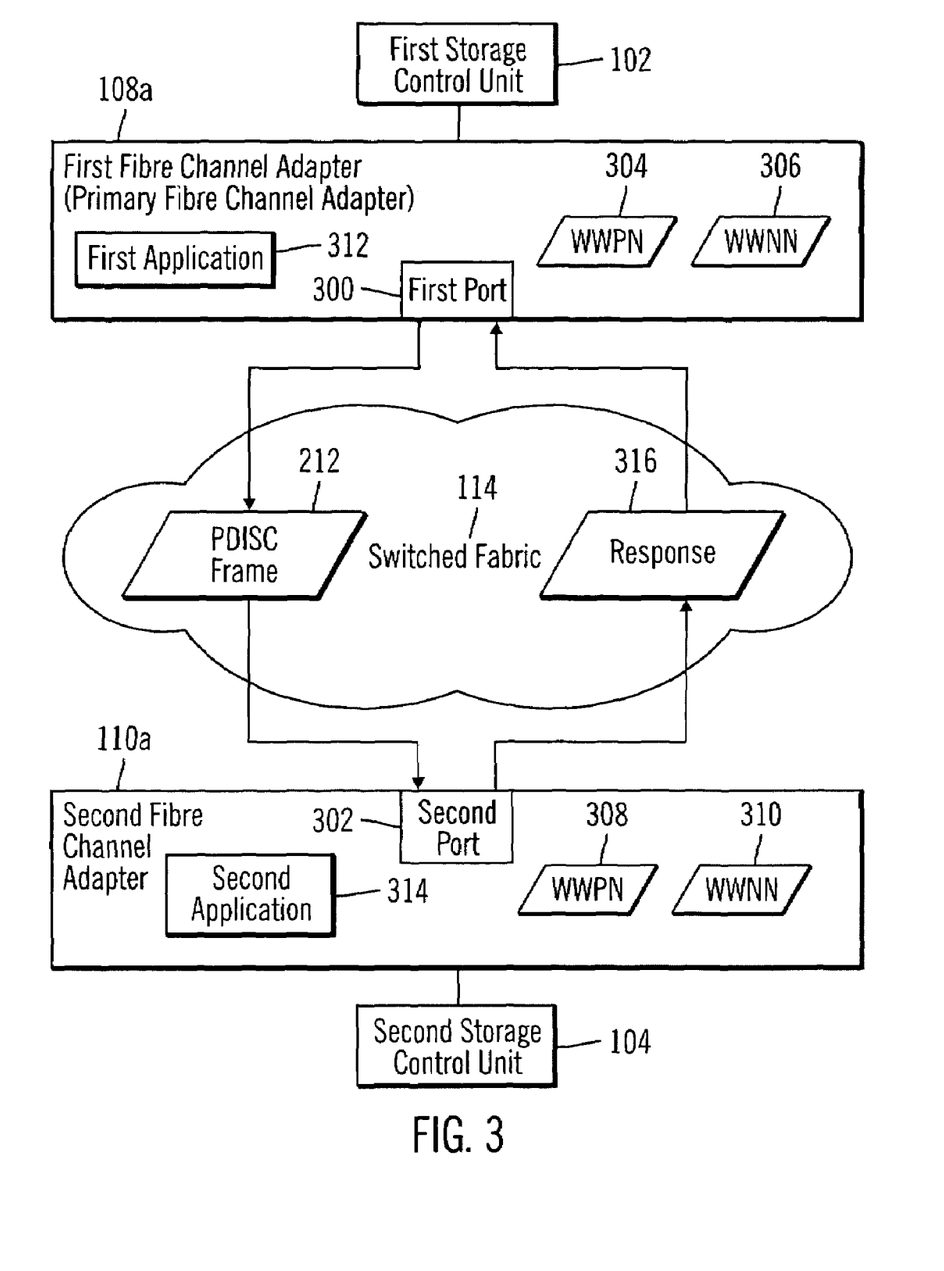
FIG. 3 illustrates a block diagram of communications between two fibre channel adapters, in accordance with certain described implementations of the invention.

FIG. 3 illustrates a block diagram of communications between two fibre channel adapters 108a, 110a, in accordance with certain implementations of the invention.

The first fibre channel adapter 108a that is coupled to the first storage control unit 102, may include a first port 300 that communicates with the switched fabric 114. The second fibre channel adapter 110a that is coupled to the second storage control unit 104 may include a second port 302 that also communicates with the switched fabric 114.

In addition to the first port 300, the first fibre channel adapter includes a WWPN 304 corresponding to the first port 300 and a WWNN 306 corresponding to the first storage control unit 102. Also, in addition to the second port 302, the second fibre channel adapter 110a includes a WWPN 308 corresponding to the second port 302 and a WWNN 310 corresponding to the second storage control unit 104.

In certain embodiments, a first application 312 coupled to the first port 300 sends a PDISC frame 212 to the second port 302 to validate the identity of the second storage control unit 104. In response to receiving the PDISC frame 212 across the switched fabric 114, a second application 314 coupled to the second port 302 may determine and send a response 316 to the first port 300.

Therefore, FIG. 3 describes an embodiment in which the first port 300 sends a PDISC frame 212 to the second port 302 and receives a response 316. In certain embodiments, the first port 300 may not receive a response in a certain amount of time and may assume that no response is likely to be received from the second port 302.

Figure 4:
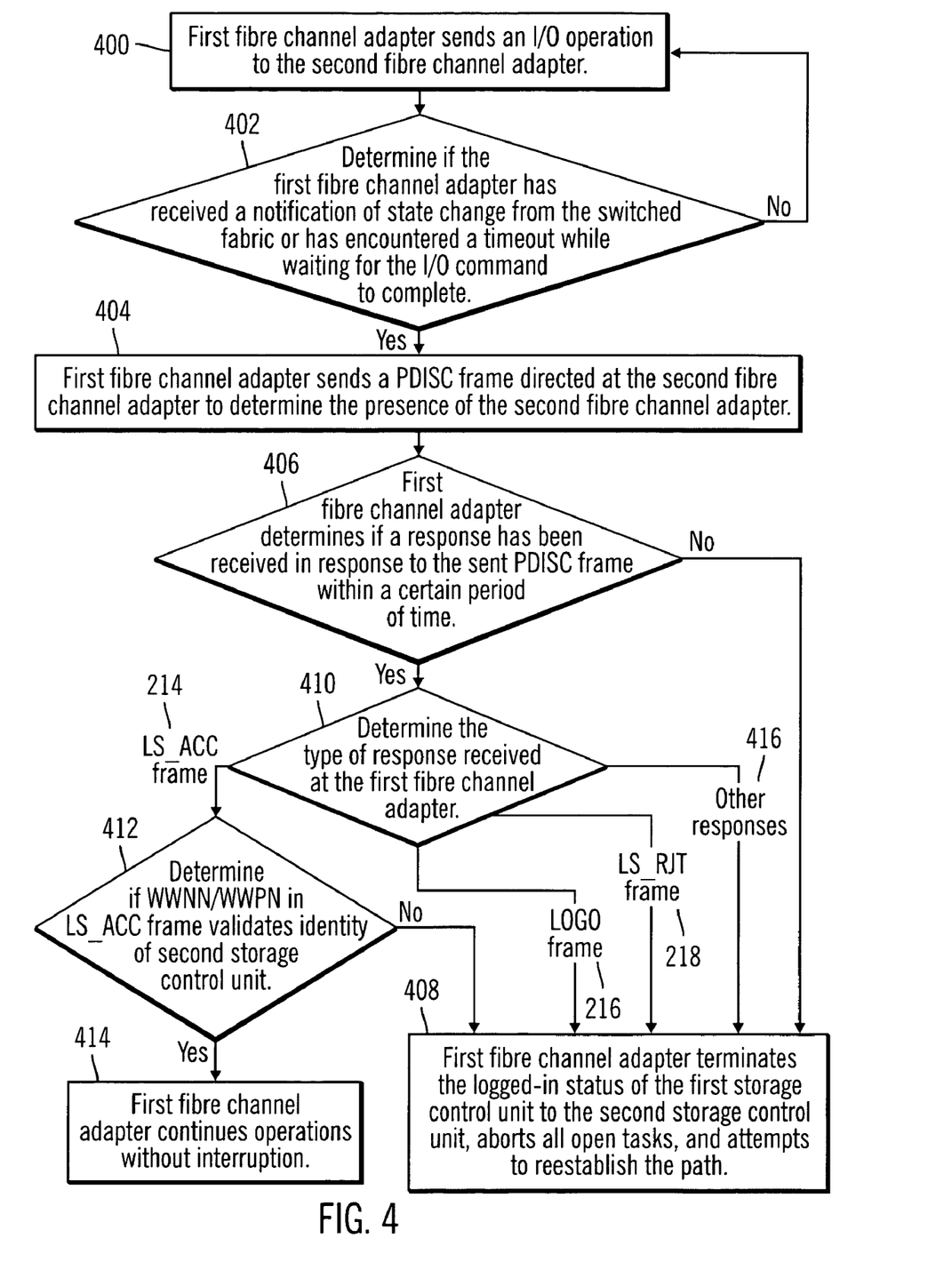
FIG. 4 illustrates logic implemented in a primary fibre channel adapter, in accordance with certain described implementations of the invention.

FIG. 4 illustrates logic implemented in the first fibre channel adapter 108a, where the first fibre channel adapter 108a may be a primary fibre channel adapter coupled to the primary storage control unit 102, in accordance with certain implementations of the invention. In certain embodiments, the logic may be executed by the first application 312 implemented in the first fibre channel adapter 108a.

Control starts at block 400 where the first fibre channel adapter 108a sends an I/O operation to the second fibre channel adapter 110a. The first fibre channel adapter 108a determines (at block 402) whether the first fibre channel adapter 108a has received a a notification of a state change from the switched fabric 114 or has encountered a timeout while waiting for an I/O operation to complete. If no notification of a state change has been received and no timeout has been encountered, the first fibre channel adapter 108a sends (at block 400) another I/O operation to the second fibre channel adapter 110a.

If the first fibre channel adapter 108a determines (at block 402) that the first fibre channel adapter 108a has received a notification of a state change from the switched fabric 114 or has encountered a timeout while waiting for an I/O operation to complete, then the first fibre channel adapter 108 sends (at block 404) a PDISC frame 212 directed at the second fibre channel adapter 110a to determine the presence of the second fibre channel adapter 110a. Therefore, in the implementations the PDISC frame 212 is sent in response to a notification of a state change of the switched fabric 114 or a timeout while waiting for an I/O command to complete.

The first fibre channel adapter 108a determines (at block 406) if the response 316 has been received in response to the sent PDISC frame 212 within a certain amount of time. The response 316 that may be received by the first fibre channel adapter 108a may be generated by the second fibre channel adapter 110a on receiving the PDISC frame 212. The PDISC frame 212 does not disrupt I/O operations that occur between the first and second fibre channel adapters 108a, 110a.

If the first fibre channel adapter 108a determines (at block 406) that a response 316 has not been received in response to the sent PDISC frame 212 within a certain amount of time, then the first fibre channel adapter 108a terminates (at block 408) the logged-in status of the first storage control unit 102 to the second storage control unit 104, aborts all open tasks, and attempts to reestablish a path between the first storage control unit 102 and the second storage control unit 104.

If the first fibre channel adapter 108a determines (at block 406) that the response 316 has been received in response to the sent PDISC frame 212 within a certain amount of time, then the first fibre channel adapter 108a determines (at block 410) the type of response 316 received at the first fibre channel adapter 108a.

If the determined response 316 (at block 410) is an LS_ACC frame 214 then the first fibre channel adapter 108a determines (at block 412) if the WWPN and the WWNN included in the LS_ACC frame 214 validates the identity of the second storage control unit 104. The LS_ACC frame 214 validates the identity of the second storage control unit 104 if the WWPN and the WWNN included in the LS_ACC frame is the same as the WWPN 308 and the WWNN 310 respectively, that are included in the second fibre channel adapter 110a.

If the first fibre channel adapter 108a determines (at block 412) that the identity of the second storage control unit 104 is validated, then the first fibre channel adapter 108a continues (at block 414) operations without interruptions. If the first fibre channel adapter 108a determines (at block 412) that the identity of the second storage control unit 104 is not validated, then the first fibre channel adapter 108a terminates (at block 408) the logged-in status of the first storage control unit 102 to the second storage control unit 104, aborts all open tasks, and attempts to reestablish a path between the first storage control unit 102 and the second storage control unit 104.

If the determined response 316 (at block 410) is a LOGO frame 216 or an LS_RJT frame 218 or some other response 416 then the first fibre channel adapter 108a terminates (at block 408) the logged-in status of the first storage control unit 102 to the second storage control unit 104, aborts all open tasks, and attempts to reestablish a path between the first storage control unit 102 and the second storage control unit 104.

Therefore, FIG. 4 illustrates certain embodiments in which the first fibre channel adapter 108a sends a non-disruptive PDISC frame 212 to a second fibre channel adapter 110a to validate the second fibre channel adapter 110a. In certain embodiments, the first fibre channel adapter 108a may be a primary fibre channel adapter and the second fibre channel adapter 110a may be a secondary fibre channel adapter and the logic may be implemented in the first application 312 that may be coupled to the first fibre channel adapter 108a.

Figure 5:
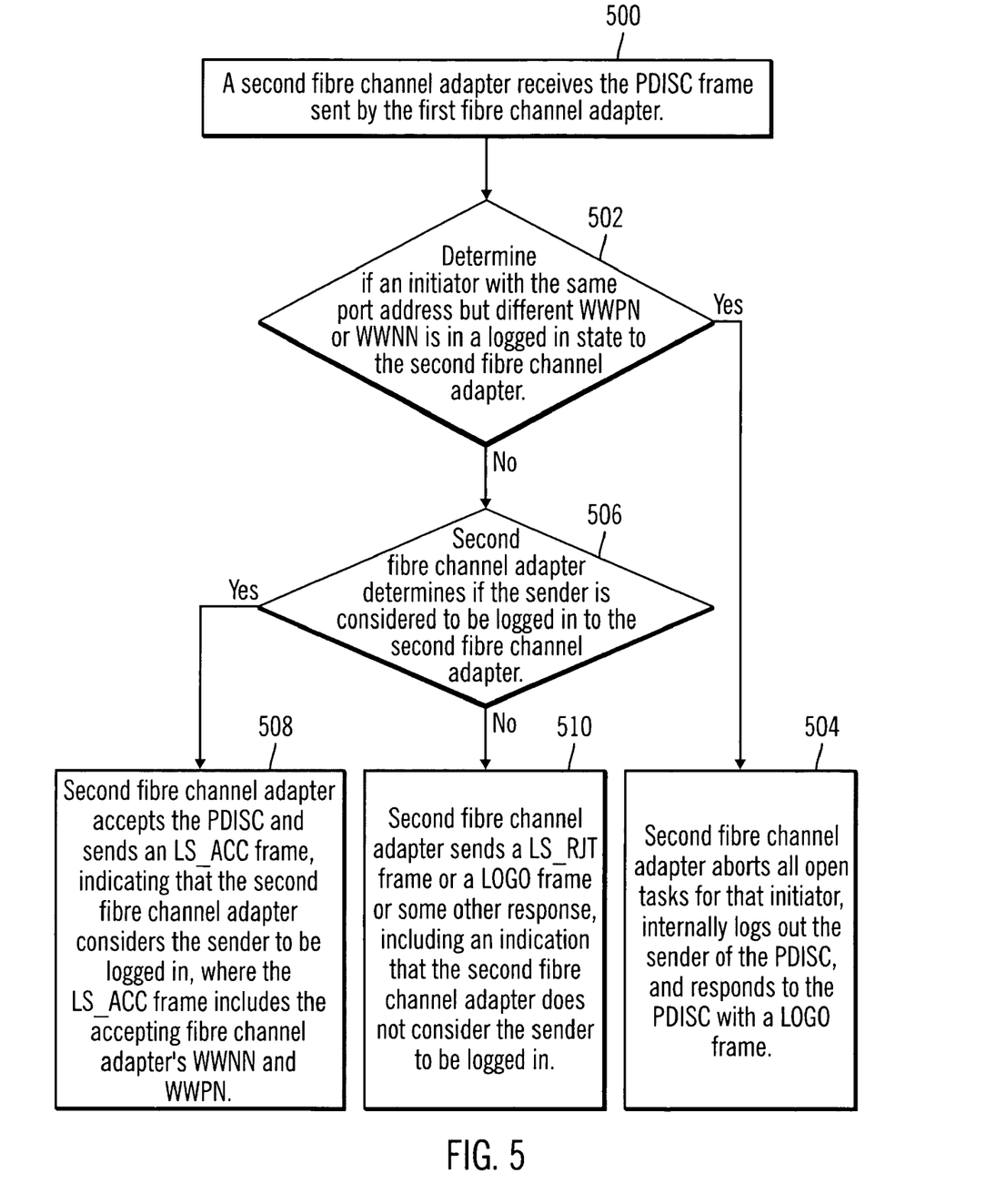
FIG. 5 illustrates logic implemented in a secondary fibre channel adapter, in accordance with certain described implementations of the invention.

FIG. 5 illustrates logic that may be implemented in the second fibre channel adapter 110a, where the second fibre channel adapter 110a may be a secondary fibre channel adapter coupled to the secondary storage control unit 104, in accordance with certain implementations of the invention. In certain embodiments, the logic may be executed by the second application 314 implemented in the second fibre channel adapter 110a.

Control starts at block 500, where the second fibre channel adapter 110a receives the PDISC frame 212 sent (at block 404) by the first fibre channel adapter 108a. The second fibre channel adapter 110a determines (at block 502) if an initiator with the same port address but different WWPN or WWNN when compared to the sender of the PDISC frame 212 is in a logged in state to the second fibre channel adapter 110a (in certain embodiments the initiator may be a different fibre channel adapter than the first fibre channel adapter 108a that sent the PDISC frame 212). If so, the second fibre channel adapter 110a aborts (at block 504) all open tasks for that initiator, internally logs out the sender of the PDISC, and responds to the PDISC with a LOGO frame 216. Therefore, the embodiments identify potential errors in the computing environment 100 involving different WWPN or WWNN corresponding to the same port address.

If the second fibre channel adapter 110a determines (at block 502) that an initiator with the same port address but different WWPN or WWNN when compared to the sender of the PDISC frame 212 is not in a logged in state to the second fibre channel adapter 110a, then the second fibre channel adapter 110a determines (at block 506) if the sender of the PDISC frame is considered to be logged in by the second fibre channel adapter 110a. If so, then the second fibre channel adapter 110a accepts the PDISC frame 212 and sends an LS_ACC frame 214, indicating that the second fibre channel adapter 110a considers the sender to be logged in, where the LS_ACC frame 214 includes the second fibre channel adapter's 110a WWNN 310 and WWPN 308. If not, then the second fibre channel adapter 110a sends a LS_RJT frame 218 or a LOGO frame 216 or some other response 416, including an indication that the second fibre channel adapter does not consider the sender to be logged in. The responses sent (at blocks 508, 510) by the second fibre channel adapter 110a may be processed (at blocks 406, 410, 412) by the first fibre channel adapter 108a.

Therefore, FIG. 5 describes an embodiment in which the second fibre channel adapter 110a responds to a PDISC frame 212 sent by the first fibre channel adapter 108. In certain embodiments, the first fibre channel adapter 108a may be a primary fibre channel adapter and the second fibre channel adapter 110a may be a secondary fibre channel adapter and the logic may be implemented in the second application 314 that may be coupled to the second fibre channel adapter 110a.

The embodiments have been described with one port per fibre channel adapter. In alternative implementations, a single fibre channel adapter with one or more ports may perform data transfer from one plurality of storage control units to another plurality of storage control units. While frames have been used in the embodiments, alternative embodiments may use other data transmission units besides frames. Furthermore, the embodiments may also be implemented in networks that are not based on fibre channel. Additionally, in alternative implementations the first and second applications 312, 314 may be implemented in the storage control units 102, 104 and control the operations of the fibre channel adapters 108a, 110a.

In certain additional embodiments implemented in a fibre channel PPRC environment, a PPRC primary device, such as the primary storage control unit 102, may determine, via positive identification of a secondary storage control unit 104, whether a login is actually required to the secondary storage control unit 104 because of a state change in a fibre channel network. As a result of the positive identification of the secondary storage control unit 104, repeated disruptive logins to the secondary storage control unit 104 are not required in the embodiments.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 6:
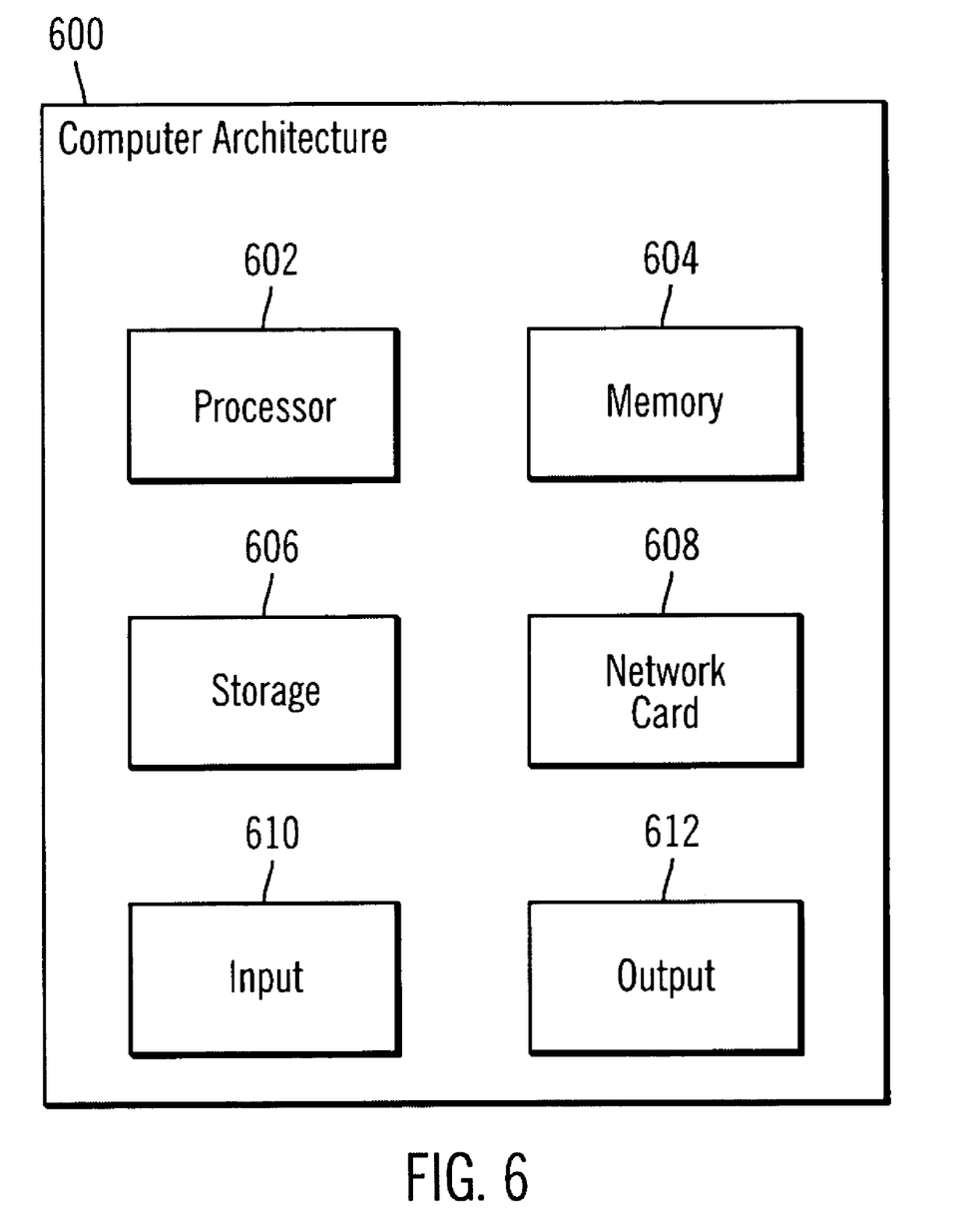
FIG. 6 illustrates a block diagram of a computer architecture in which certain described aspects of the invention are implemented.

FIG. 6 illustrates a block diagram of a computer architecture in which certain aspects of the invention are implemented. FIG. 6 illustrates one implementation of the host 101, and the storage control units 102, 104, 106, and the fibre channel adapters 108a ... 108q, 110a ... 110r, 112a ... 112s. Not all elements illustrated in FIG. 6 are required to be present in the host 101, the storage control units 102, 104, 106, and the fibre channel adapters 108a ... 108q, 110a ... 110r, 112a ... 112s. The host 101, the storage control units 102, 104, 106, and the fibre channel adapters 108a ... 108q, 110a ... 110r, 112a ... 112s may implement a computer architecture 600 having a processor 602, a memory 604 (e.g., a volatile memory device), and storage 606 (e.g., a non-volatile storage, magnetic disk drives, optical disk drives, tape drives, etc.). The storage 606 may comprise an internal storage device, an attached storage device or a network accessible storage device. Programs in the storage 606 may be loaded into the memory 604 and executed by the processor 602 in a manner known in the art. The architecture may further include a network card 608 to enable communication with a network. The architecture may also include at least one input 610, such as a keyboard, a touchscreen, a pen, voice-activated input, etc., and at least one output 612, such as a display device, a speaker, a printer, etc.

The logic of FIGS. 4 and 5 describes specific operations occurring in a particular order. Further, the operations may be performed in parallel as well as sequentially. In alternative implementations, certain of the logic operations may be performed in a different order, modified or removed and still implement implementations of the present invention. Moreover, steps may be added to the above described logic and still conform to the implementations. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method, comprising:

sending a PDISC Extended Link Service frame from a first device to a second device, wherein the first device is coupled to the second device via a fabric, and wherein the PDISC Extended Link Service frame is capable of determining a presence of the second device without disrupting I/O operations between the first device and the second device;

receiving the PDISC Extended Link Service frame at the second device, and determining whether an initiator with the same port address but a different World Wide Port Name (WWPN) or World Wide Node Name (WWNN) than the first device is in a logged in state to the second device;

logging out the first device, and responding to the PDISC Extended Link Service frame with a LOGO frame, in response to determining that an initiator with the same port address but a different WWPN or WWNN than the first device is in a logged in state to the second device;

determining, at the second device, whether the first device is considered to be logged in to the second device, in response to determining that an initiator with the same port address but a different WWPN or WWNN than the first device is not in a logged in state to the second device;

accepting, by the second device, the PDISC Extended Link Service Frame, and sending an LS_ACC frame indicating that the second device considers the first device to be logged in, wherein the LS_ACC frame includes the WWNN and WWPN of the second device, in response to determining that the first device is considered to be logged in to the second device;

sending, by the second device, an LS_RJT frame or a LOGO frame that includes an indication that the second device does not consider the first device to be logged in to the second device; and determining, by the first device, whether to continue the I/O operations from the first device to the second device based on receiving a response to the PDISC Extended Link Service Frame within a time period.

2. The method of claim 1, wherein the first device determines a possibility of an invalidation of the second device by determining whether the first device has received either a notification of a state change from the fabric or has timed out while waiting for a completion of an I/O operation sent from the first device to the second device.

3. The method of claim 1, further comprising:

continuing the I/O operations, if the response to the PDISC Extended Link Service frame within the time period is a frame that validates the World Wide Node Name and the World Wide Port name associated with a connection to the second device.

4. The method of claim 1, further comprising:

terminating a connection from the first device to the second device, if the response to the PDISC Extended Link Service frame is not received within the time period or if the response is a frame that indicates that the second device does not consider the first device to be logged in to the second device.

5. The method of claim 1, wherein the first and second devices are fibre channel adapters coupled to primary and secondary storage controllers respectively, wherein the fabric is a switched fabric, and wherein the fibre channel adapters communicate using extended link services commands.

6. The method of claim 1, wherein:

if the response is the LS_ACC frame, then:
(i) the first device continues the I/O operations without interruption if the WWNN or WWPN in the LS_ACC frame validates an identity of the second device; and
(ii) the first device terminates a logged in state of the first device to the second device, aborts all open tasks, and attempts to reestablish paths, if the WWNN or WWPN in the LS_ACC frame does not validate the identity of the second device.

7. The method of claim 6, wherein:

if the response is a LS_RJT frame or a LOGO frame then the first device terminates the logged in state of the first device to the second device, aborts all open tasks, and attempts to reestablish paths.

8. A system, comprising:

a first device;
a fabric, wherein the first device is coupled to the fabric;
a second device coupled to the fabric;
a memory; and
a processor coupled to the memory, wherein the processor performs operations, the operations comprising:

sending a PDISC Extended Link Service frame from the first device to the second device, and wherein the PDISC Extended Link Service frame is capable of determining a presence of the second device without disrupting I/O operations between the first device and the second device;

receiving the PDISC Extended Link Service frame at the second device, and determining whether an initiator with the same port address but a different World Wide Port Name (WWPN) or World Wide Node Name (WWNN) than the first device is in a logged in state to the second device;

logging out the first device, and responding to the PDISC Extended Link Service frame with a LOGO frame, in response to determining that an initiator with the same port address but a different WWPN or WWNN than the first device is in a logged in state to the second device;

determining, at the second device, whether the first device is considered to be logged in to the second device, in response to determining that an initiator with the same port address but a different WWPN or WWNN than the first device is not in a logged in state to the second device;

accepting, by the second device, the PDISC Extended Link Service Frame, and sending an LS_ACC frame indicating that the second device considers the first device to be logged in, wherein the LS_ACC frame includes the WWNN and WWPN of the second device, in response to determining that the first device is considered to be logged in to the second device;

sending, by the second device, an LS_RJT frame or a LOGO frame that includes an indication that the second device does not consider the first device to be logged in to the second device; and determining, by the first device, whether to continue the I/O operations from the first device to the second device based on receiving a response to the PDISC Extended Link Service Frame within a time period.

9. The system of claim 8, wherein the first device-determines a possibility of an invalidation of the second device by-determining whether the first device has received either a notification of a state change from the fabric or has timed out while waiting for a completion of an I/O operation sent from the first device to the second device.

10. The system of claim 8, the operations further comprising:

continuing the I/O operations, if the response to the PDISC Extended Link Service frame within the time period is a frame that validates the World Wide Node Name and the World Wide Port name associated with a connection to the second device.

11. The system of claim 8, the operations further comprising:

terminating a connection from the first device to the second device, if the response to the PDISC Extended Link Service frame is not received within the time period or if the response is a frame that indicates that the second device does not consider the first device to be logged in to the second device.

12. The system of claim 8, wherein the first and second devices are fibre channel adapters coupled to primary and secondary storage controllers respectively, wherein the fabric is a switched fabric, and wherein the fibre channel adapters communicate using extended link services commands.

13. The system of claim 8, wherein:

if the response is the LS_ACC frame, then:
(i) the first device continues the I/O operations without interruption if the WWNN or WWPN in the LS_ACC frame validates an identity of the second device; and
(ii) the first device terminates a logged in state of the first device to the second device, aborts all open tasks, and attempts to reestablish paths, if the WWNN or WWPN in the LS_ACC frame does not validate the identity of the second device.

14. The system of claim 13, wherein:

if the response is a LS_RJT frame or a LOGO frame then the first device terminates the logged in state of the first device to the second device, aborts all open tasks, and attempts to reestablish paths.

15. A computer readable storage medium, wherein code stored in the computer readable storage medium when executed by a processor causes operations, the operations comprising:

sending a PDISC Extended Link Service frame from a first device to a second device, wherein the first device is coupled to the second device via a fabric, and wherein the PDISC Extended Link Service frame is capable of determining a presence of the second device without disrupting I/O operations between the first device and the second device;

receiving the PDISC Extended Link Service frame at the second device, and determining whether an initiator with the same port address but a different World Wide Port Name (WWPN) or World Wide Node Name (WWNN) than the first device is in a logged in state to the second device;

logging out the first device, and responding to the PDISC Extended Link Service frame with a LOGO frame, in response to determining that an initiator with the same port address but a different WWPN and WWNN than the first device is in a logged in state to the second device;

determining, at the second device, whether the first device is considered to be logged in to the second device, in response to determining that an initiator with the same port address but a different WWPN or WWNN than the first device is not in a logged in state to the second device;

accepting, by the second device, the PDISC Extended Link Service Frame, and sending an LS_ACC frame indicating that the second device considers the first device to be logged in, wherein the LS_ACC frame includes the WWNN and WWPN of the second device, in response to determining that the first device is considered to be logged in to the second device;

sending, by the second device, an LS_RJT frame or a LOGO frame that includes an indication that the second device does not consider the first device to be logged in to the second device; and determining, by the first device, whether to continue the I/O operations from the first device to the second device based on receiving a response to the PDISC Extended Link Service Frame within a time period.

16. The computer readable storage medium of claim 15, wherein the first device determines a possibility of an invalidation of the second device by-determining whether the first device has received either a notification of a state change from the fabric or has timed out while waiting for a completion of an I/O operation sent from the first device to the second device.

17. The computer readable storage medium of claim 15, the operations further comprising:

continuing the I/O operations, if the response to the PDISC Extended Link Service frame within the time period is a frame that validates the World Wide Node Name and the World Wide Port name associated with a connection to the second device.

18. The computer readable storage medium of claim 15, further comprising:

terminating a connection from the first device to the second device, if the response to the PDISC Extended Link Service frame is not received within the time period or if the response is a frame that indicates that the second device does not consider the first device to be logged in to the second device.

19. The computer readable storage medium of claim 15, wherein the first and second devices are fibre channel adapters coupled to primary and secondary storage controllers respectively, wherein the fabric is a switched fabric, and wherein the fibre channel adapters communicate using extending link services commands.

20. The computer readable storage medium of claim 15, wherein:

if the response is the LS_ACC frame, then:
(i) the first device continues the I/O operations without interruption if the WWNN or WWPN in the LS_ACC frame validates an identity of the second device; and
(ii) the first device terminates a logged in state of the first device to the second device, aborts all open tasks, and attempts to reestablish paths, if the WWNN or WWPN in the LS_ACC frame does not validate the identity of the second device.

21. The computer readable storage medium of claim 20, wherein:

if the response is a LS_RJT frame or a LOGO frame then the first device terminates the logged in state of the first device to the second device, aborts all open tasks, and attempts to reestablish paths.

* * * * *